Dec. 14, 1926.
P. H. FOLEY
1,610,508
MIXTURE HUMIDIFIER FOR EXPLOSIVE ENGINES
Filed May 23, 1925
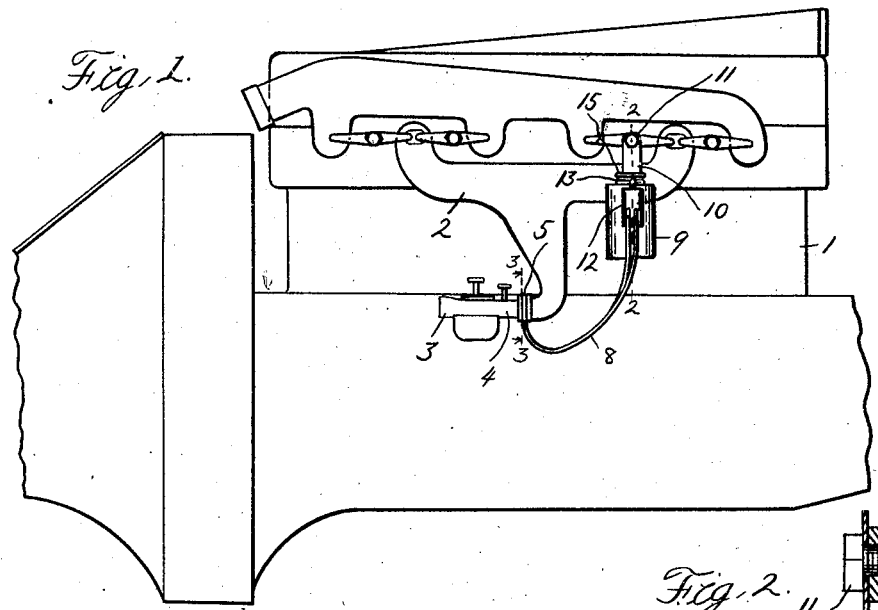
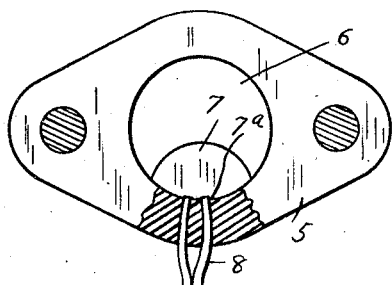
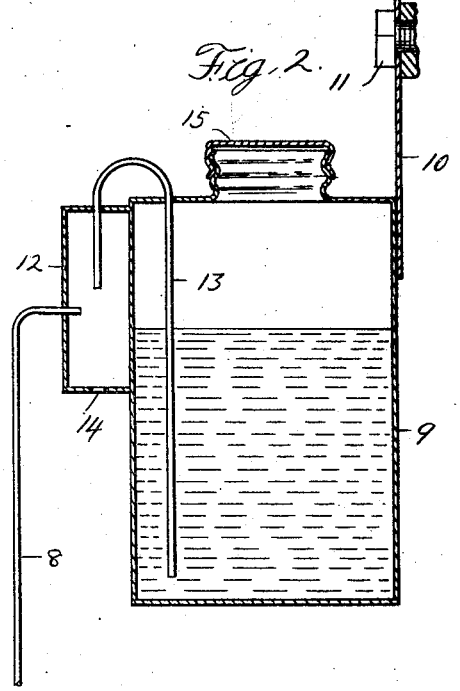
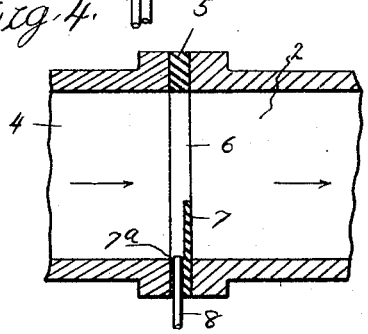
Inventor
Peter H. Foley
By J. S. Murray
Attorney Patented Dec. 14, 1926.

1,610,508

UNITED STATES PATENT OFFICE.

PETER H. FOLEY, OF DETROIT, MICHIGAN.

MIXTURE HUMIDIFIER FOR EXPLOSIVE ENGINES.

Application filed May 23, 1925. Serial No. 32,594.

This invention relates to mixture humidifiers for explosive engines.

It is an object of the invention to provide an attachment adapted to be mounted in its entirety upon the intake manifold of an engine for delivering humidified air into the intake passage to be mixed with the fuel.

Another object is to introduce humidified air into the intake passage through a plate clamped between the carburetor and intake manifold of an explosive engine.

Still another object is to continuously humidify air and deliver the humidified air to the intake passage of an explosive engine responsive to the suction of said engine.

These and various other objects the invention attains by the construction hereinafter described and illustrated in the accompanying drawing, wherein:

Fig. 1 is a side view of an explosive engine equipped with the improved humidifying attachment.

Fig. 2 is an enlarged section on line 2—2 of Fig. 1, showing a tank adapted to be carried by the intake manifold, and a provision for drawing humidified air from said tank.

Fig. 3 is a section on line 3—3 of Fig. 1 showing a plate through which humidified air is introduced into the intake manifold.

Fig. 4 is a central vertical section of Fig. 3.

In these views, the reference characters 1, 2 and 3 respectively, designate an explosive engine, the intake manifold of said engine, and the carburetor thereof.

Between the outlet 4 of said carburetor and the inlet of the intake manifold, there is clamped a plate 5, formed with a central opening 6 registering with the mixture passage of said carburetor and manifold. My co-pending application, Ser. No. 19,307, filed Mar. 30, 1925, covers plate 5. The plate 5, which is preferably formed of fibre, has an integral baffle member 7 upwardly projecting into the opening 6. The thickness of said baffle member being somewhat reduced as compared to the plate proper.

The present invention provides for continuously introducing humidified air into the mixture passage through the plate 5. Thus the lower portion of said plate is formed with adjacent bores 7ª into which are led corresponding ends of metal tubes 8 opening within the central orifice of said plate adjacent to the bottom of the baffle 7.

Upon the manifold 2 there is mounted a water tank 9, supported in any suitable manner, as for example by means of a sheet metal hanger 10 suitably attached to said tank and adapted to be engaged by one of the clamping bolts 11 of said manifold.

To the upper portion of the tank 9 there is exteriorly secured a low pressure chamber 12, into which the intake ends of the tubes 8 open intermediate of the top and bottom of said chamber. Into said chamber there also opens through the top thereof, the outlet end of a water delivery tube 13 which forms a return bend above the chamber 12 and passes through the top of the tank 9 extending downwardly within said tank, and terminating adjacent to the bottom. The chamber 12 is imperforate, except for the provision of a restricted air inlet 14 in the bottom of said chamber. The tank 9 has a suitable fill opening normally suitably closed, as for example by the screw-cap 15.

In the operation of the described device, when the engine 1 is started, the suction existing in the intake passage of said engine acts through the tubes 8 and produces a sub-atmospheric condition in the chamber 12, with the result that water flows from the tank 9 through the tube 13 and discharges into said chamber, air also being drawn into said chamber through the restricted inlet 14. The inflowing air vaporizes the water, and the air thus humidified flows through the tubes 8 and discharges into the mixture passage through the plate 5. The heavier particles of fuel flowing through the mixture passage because of their weight occupy the lower portion of said passage, and consequently encounter the baffle 7, at the same time said particles encounter the high velocity current of humidified air discharging at the base of said baffle, and are broken up and violently agitated by said air current so as to produce a uniform and highly combustible mixture.

It has been found that the water vapor thus commingled with the explosive charge increases the efficiency of said charge and reduces the formation of free carbon so that necessity of cleaning the spark plugs and scraping carbon deposits from the piston heads is practically eliminated.

It is to be noted that the water tank 9 is in sufficiently close proximity to the engine to derive considerable heat from the latter, so that if ice forms within said tank in cold weather, it will soon melt after the engine has been started.

What I claim is:

1. In a device of the character described, the combination with the intake manifold of an explosive engine, of a water vessel, a common means for securing said manifold and vessel to the engine, a low pressure chamber having a restricted air inlet, a water supply connection to said chamber from said vessel, and means for delivering humidified air from said chamber to the mixture passage of said manifold.

2. In a device of the character described, the combination with a water vessel, of a low pressure chamber mounted upon said vessel and having a restricted air inlet in its lower portion, a water delivery pipe opening into said chamber and having its inlet in the lower portion of said vessel, and a suction connection from said vessel to the intake passage of an internal combustion engine.

In testimony whereof I sign this specification.

PETER H. FOLEY.